United States Patent
Szabo et al.

(10) Patent No.: US 11,190,615 B2
(45) Date of Patent: *Nov. 30, 2021

(54) TECHNIQUE FOR ENHANCING RENDERING OF DISPLAYABLE CONTENT

(71) Applicant: Telefonaktiebolaget LM Ericsson (publ), Stockholm (SE)

(72) Inventors: Geza Szabo, Kecskemet (HU); Sándor Rácz, Cegléd (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/717,870

(22) Filed: Dec. 17, 2019

(65) Prior Publication Data
US 2020/0128102 A1 Apr. 23, 2020

Related U.S. Application Data

(63) Continuation of application No. 15/535,268, filed as application No. PCT/EP2014/079386 on Dec. 29, 2014, now Pat. No. 10,536,555.

(51) Int. Cl.
*H04L 29/08* (2006.01)
*H04L 29/06* (2006.01)
(Continued)

(52) U.S. Cl.
CPC .......... *H04L 67/322* (2013.01); *G06F 9/5027* (2013.01); *H04L 65/601* (2013.01);
(Continued)

(58) Field of Classification Search
CPC ..... H04L 65/801; H04L 65/80; H04L 69/164; H04L 67/322; H04L 67/02; G06F 9/5027; G06F 9/4881
See application file for complete search history.

(56) References Cited

U.S. PATENT DOCUMENTS

2003/0121050 A1* 6/2003 Kalva ............ H04N 21/234318
725/97
2004/0221053 A1* 11/2004 Codella ............... H04L 47/2416
709/231
(Continued)

FOREIGN PATENT DOCUMENTS

WO 9921338 A1 4/1999

OTHER PUBLICATIONS

Roskind, J., "QUIC Quick UDP Internet Connections Multiplexed Stream Transport over UDP", IETF-88 TSV Area Presentation, Nov. 7, 2013, pp. 1-26, Google Corp.
(Continued)

*Primary Examiner* — Abdullahi E Salad
(74) *Attorney, Agent, or Firm* — Coats & Bennett, PLLC

(57) ABSTRACT

A technique for enhancing rendering and scheduling of displayable content comprising plural objects is disclosed. In a first method aspect, the method is performed in a user equipment (UE) and comprises prioritizing, based on collected information on object priority, objects responsible for a start rendering time over other objects, and transmitting information concerning the prioritized objects towards an object scheduler in an access network. In a second method aspect, the method is performed in an object scheduler and comprises receiving the information concerning prioritized objects from the UE, wherein objects responsible for a start rendering time have been prioritized over other objects, and scheduling objects to be transmitted to the UE based on the information concerning the prioritized objects.

19 Claims, 5 Drawing Sheets

(51) Int. Cl.
*G06F 9/50* (2006.01)
*G06F 9/48* (2006.01)

(52) U.S. Cl.
CPC ............ *H04L 65/80* (2013.01); *H04L 69/164* (2013.01); *G06F 9/4881* (2013.01); *H04L 67/02* (2013.01)

(56) References Cited

U.S. PATENT DOCUMENTS

| | | | | |
|---|---|---|---|---|
| 2009/0070786 | A1* | 3/2009 | Alves | G06F 9/541 719/318 |
| 2009/0325577 | A1* | 12/2009 | Furtenback | H04W 36/0061 455/436 |
| 2010/0226252 | A1* | 9/2010 | Gogic | H04L 47/12 370/236 |
| 2012/0092995 | A1* | 4/2012 | Arvidsson | H04L 47/11 370/235 |
| 2012/0230345 | A1* | 9/2012 | Ovsiannikov | H04L 47/22 370/412 |
| 2013/0226992 | A1* | 8/2013 | Bapst | H04L 67/10 709/203 |
| 2014/0029421 | A1* | 1/2014 | Rajagopalan | H04L 41/0816 370/230 |
| 2014/0269484 | A1* | 9/2014 | Dankberg | H04L 12/1881 370/312 |
| 2015/0296499 | A1* | 10/2015 | Huang | H04W 72/048 370/329 |

OTHER PUBLICATIONS

Grigorik, I., "High Performance Networking in Google Chrome", pp. 1-22, retrieved on May 18, 2017, retrieved from Internet https://www.igvita.com/posa/high-performance-networking-in-google-chrome/.

Websiteoptimization.com, "Optimize Start Render Time", pp. 1-6, retrieved on May 18, 2017, retrieved from Internet http://websiteoptimization.com/speed/tweak/start-render/.

Bevan, N., "Human-Computer Interaction Standards", Proceedings of the 6th Annual Conference on Human Computer Interaction, Jul. 1995, pp. 1-8.

Nginx, "Install on your webserver", pp. 1-2, retrieved on May 18, 2017, retrieved from Internet https://developers.google.com/speed/pagespeed/module.

W3C, "Resource Priorities Editor's Draft Apr. 16, 2014", pp. 1-10, retrieved on May 18, 2017, retrieved from Internet https://w3c.github.io/web-performance/specs/ResourcePriorities/Overview.html.

Wang, X. et al., "Demystifying Page Load Performance with WProf", 10th USENIX Symposium on Networked Systems Design and Implementation, 2013, pp. 473-485, Berkeley, California, US.

3rd Generation Partnership Project, Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11), 3GPP TS 37.320 V11.4.0, Sep. 2014, pp. 1-23.

Torch Mobile Inc., "ResourceFetcher", pp. 1-40, retrieved on Jun. 12, 2017, retrieved from Internet https://code.google.com/p/chromium/codesearch#chromium/src/third_party/WebKit/Source/core/fetch/ResourceFetcher.cpp&sq=package:chromium&l=108&type=cs.

HTTP Archive, "The HTTP Archive tracks how the Web is built", pp. 1-2, retrieved on May 18, 2017, retrieved from Internet http://www.httparchive.org/.

* cited by examiner

TECHNIQUE FOR ENHANCING RENDERING OF DISPLAYABLE CONTENT

RELATED APPLICATIONS

The present application is a continuation of U.S. patent application Ser. No. 15/535,268, which was filed on Jun. 12, 2017, which is a national stage application of PCT/EP2014/079386, which was filed on Dec. 29, 2014, the disclosures of each of which are incorporated herein by reference in their entirety.

TECHNICAL FIELD

The present disclosure generally relates to enhancing rendering of displayable content on a user equipment when the content is received via an access network. The technique of the present disclosure may be embodied in methods, apparatuses and computer programs.

BACKGROUND

The average size and complexity of web pages have constantly been growing. For instance, an average web page has over 100 objects and is approximately 1,200 Kbyte in size today. The rendering of such a voluminous web page is a resource consuming task causing heavy load on the user equipment (UE hereinafter). Moreover, the load times for such web pages can amount to 5 seconds and more (e.g., with a 10 Mbps connection and a modern Personal Computer, PC). It is evident that such load times significantly reduce the Quality of Experience (QoE) from a user perspective (e.g., in terms of start of web page rendering). As such, the web page load time is a key performance indicator (KPI) for user QoE, and thus many approaches aim to reduce this KPI.

The two main factors that web page load time depends on is the CPU performance of the UE (in terms of computational time) and network capacity (in terms of load time). The potential of the enhancing either of these two factors has already been analyzed. In this regard, the following gains have been estimated: a) when computational time is reduced to zero but the network load time remains unchanged, the web page load time is reduced by 20%; conversely, b) when the network load time is reduced to one fourth, but the computational time remains unchanged, the page load time is reduced by 45%.

With an eye to a satisfactory QoE, a start rendering time ranging from 1 to 2 seconds has been recommended. This is because giving the user visual feedback that something is happening shows the user that the UE is in fact responsive. The user can plan, anticipate and adjust himself/herself to consistent response times when browsing web pages. The user can also already start browsing when most of the information of the web page (i.e., the textual content) has been rendered, while large pictures are still downloaded in the background.

The start rendering time is typically composed of a Time to First Byte (TTFB) connect time, a server response time, a time for processing objects in the head of the page, a time for initial page parsing and a time for rendering. Optimizing the start rendering time is a matter of optimizing one or more of these delay components.

There are several possible aspects to address this problem. One aspect pertains to new protocols to improve Roundtrip Time (RTT) and introduces prioritization of objects (e.g., SPeeDY, SPDY, and Quick User Datagram Protocol, UDP, Internet Connections, QUIC). Another aspect focuses on server-side optimization of the content by modules like mod_pagespeed. Moreover, a still further aspect relates to client side methods like caching, prefetching and preloading.

Today, most operators apply so called "middle boxes" with Deep Packet Inspection (DPI) to introduce traffic differentiation in the network for Internet traffic and to thus enhance user QoE. However, commonly applied end-to-end encryption (as implemented, e.g., in SPDY and QUIC) prevents the support of any kind of QoE enhancement on the last hop of such traffic.

In the example of a wireless communication scenario, end-to-end encryption thus makes it impossible for any intermediate component to be aware of the objects that are transferred through the radio access network. Thus, current DPI techniques cannot support the radio access network with the necessary information, and middle boxes are banned out from the route by design of, for example, QUIC.

Over-the-top (OTT) application providers are thus introducing other ways to improve QoE. For instance, to improve web rendering time, prioritization of web requests in requests and responses in the QUIC protocol has been introduced. QUIC uses end-to-end encryption (which is expected for most traffic in the future) and multiplexing, so supporting per flow prioritization requested by the application in the network is a challenging problem although it would enhance end-user QoE even further.

SUMMARY

Accordingly, there is a need for technique that avoids one or more of the problems discussed above, or other problems.

In a first aspect, there is provided a method for enhancing rendering of displayable content comprising plural objects, the method being performed in a user equipment, UE, and comprising prioritizing, based on collected information on object priority, objects responsible for a start rendering time over other objects; and transmitting information concerning the prioritized objects towards an object scheduler in an access network.

The access network may be a radio access network or a network for wireline network access. The radio access network may be a cellular or non-cellular network. The UE may be any stationary or mobile user terminal (e.g., a smartphone, tablet computer, laptop computer, PC, etc.).

The information concerning the prioritized objects may include a reference to (e.g., identifiers of) the prioritized objects. Additionally, a priority value for each object may be included in that information. In an alternative variant, only the objects having a high priority are referenced (e.g., identified) in that information. In the latter variant, no explicit priority value needs to be signalled.

The method may further comprise collecting, prior to the prioritizing, information on object priority. The collecting step may be performed by analysing metadata of the content to be displayed (e.g., Hypertext Markup Language, HTML, code) with respect to the objects referenced therein. Based on the analysis, objects of higher priority in terms of start rendering time decreases can be prioritized over objects of lower priority of in terms of a decreased start rendering time. In another collecting example, text objects may generally prioritized over non-text objects (e.g., pictures, media clips, etc.).

In addition or alternatively, the method may further comprise receiving, from the object scheduler, objects prioritized according to the transmitted information and rendering the displayable content with the prioritized objects. Due to this, the user of the UE is in fact experiencing increased QoE by perceiving content earlier.

The prioritizing may further comprise multiplexing plural streams over one communication resource, the streams having different priorities. Requests for the objects to be prioritized may be accommodated into the stream having the highest priority. In one example, the communication resource may be a Quick UDP, User Datagram Protocol, Internet Connections, QUIC, tunnel. In this way, the existing structures and protocols can be re-used.

The UE may have a pre-assigned subscription level and the pre-assigned subscription level may have a first numerical priority value. Different subscription levels may have different first numerical priority values. In such a case the prioritizing may be effected by using second numerical priority values offsetting the first numerical priority value, the second numerical priority values being substantially smaller than the first numerical priority value(s). In this approach, a weighted fair queue scheduler in the access network may be realized, which receives or otherwise determines the offset priorities and performs scheduling accordingly.

In a second aspect, there is provided a method for scheduling transmission of displayable content comprising plural objects, the method being performed in an object scheduler of an access network and comprising receiving information concerning prioritized objects from UE, wherein objects responsible for a start rendering time have been prioritized over other objects; and scheduling objects to be transmitted to the UE based on the information concerning the prioritized objects. In this way, the object scheduler may provide means for the UE to achieve a gain on the start rendering time.

In a refinement of the second aspect, the method may further comprise transmitting the scheduled objects to the UE. In this way, objects having a higher priority in terms of start rendering time decreases may be transmitted earlier that lower priority objects.

In further refinement of the second aspect, the receiving step may further comprise receiving plural streams over one communication resource. The stream may have different priorities, wherein requests for the objects to be prioritized are accommodated into the stream having the highest priority. The scheduling step may in such a case further comprise enforcing the requested objects to be transmitted to the UE. The communication resource may be a QUIC tunnel.

In a still further refinement of the second aspect, the UE may have a pre-assigned subscription level and the pre-assigned subscription level may have a first numerical priority value. The scheduling may then be effected by using second numerical priority values offsetting the first numerical priority value, the second numerical priority values being substantially smaller than the first numerical priority value.

In a refinement of at least one of the first and second aspects, the objects may be comprised in data traffic. The data traffic may be encrypted. The encryption may be an end-to-end encryption (e.g., between the UE and a content server or between the UE and another UE). In this way, on the one hand, integrity and security of encrypted data traffic is ascertained. On the other hand, the imminent transition to such end-to-end encryption is facilitated.

In another refinement of at least one of the first and second aspects, the displayable content may be a web page. Due to this, QoE especially for web browsing is increased.

In a further refinement of at least one of the first and second aspects, the UE may be one out of plural UEs, and all UEs may compete for a common shared radio resource in one cell of a cellular communication network. In such a case, the access network may thus belong to the cellular communication network.

In a still further refinement of at least one of the first and second aspects, the transmitting step by the UE and/or the receiving step by the object scheduler are/is implemented in one of a dedicated socket between the UE and the object scheduler, a Type of Service, ToS, field of IP packets sent by the UE, and radio signalling via Minimization of Drive Tests, MDT. As such, the information concerning the prioritized objects may be communicated via any one of these implementations In a third aspect, there is provided a computer program product comprising program code portions for performing the method of the first aspect when the computer program product is executed on one or more computing devices. The computer program product may be stored on a computer readable recording medium, such as a semiconductor memory, DVD, CD-ROM, and so on. The computer program product may also be provided for download via a communication network (e.g., the Internet or a proprietary network).

In a fourth aspect, there is provided a User Equipment, UE, for enhancing rendering of displayable content comprising plural objects, the UE comprising a component configured to prioritize, based on collected information on object priority, objects responsible for a start rendering time over other objects; and a component configured to transmit information concerning the prioritized objects towards an object scheduler in an access network.

In a fifth aspect, there is provided an object scheduler for use in an access network, for providing displayable content comprising plural objects, the object scheduler comprising a component configured to receive information concerning prioritized objects from a user equipment, UE, wherein objects responsible for a start rendering time have been prioritized over other objects; and a component configured to schedule objects to be transmitted to the UE based on the information concerning the prioritized objects.

Still further, it is to be noted that the methods and method aspects described herein may also be embodied in the apparatus of the fourth and fifth aspects comprising at least one processor and/or appropriate means for carrying out any one of the method steps.

In a sixth aspect, there is provided a system comprising the UE of the first aspect and the object scheduler of the second aspect, wherein at least the transmitting component of the UE and the receiving component of the object scheduler are implemented in one of a dedicated socket between the UE and the object scheduler, a ToS field of IP packets sent by the UE, and radio signalling via MDT.

BRIEF DESCRIPTION OF THE DRAWINGS

Embodiments of the technique presented herein are described herein below with reference to the accompanying drawings, in which.

DETAILED DESCRIPTION

Figure 1:
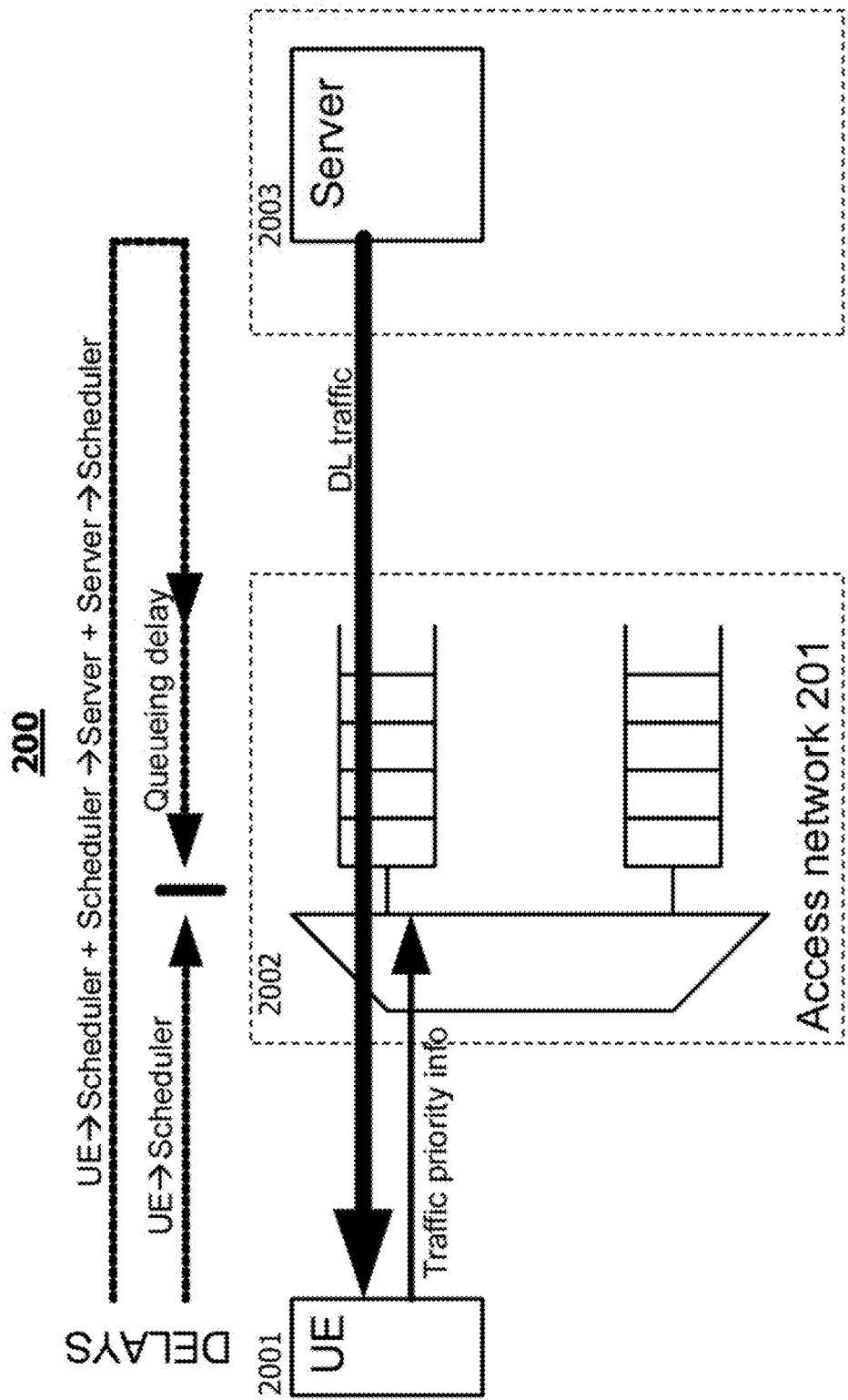
FIG. 1 shows a principle of a communications network and components involved in which embodiments of the present disclosure can be performed.

In the following description, for purposes of explanation and not limitation, specific details are set forth (such as particular signalling steps) in order to provide a thorough understanding of the technique presented herein. It will be apparent to one skilled in the art that the present technique may be practiced in other embodiments that depart from these specific details. For example, the embodiments will partially be described in the context of $3^{rd}$ generation (3G) or $4^{th}$ generation/long term evolution (4G/LTE) access networks; however, this does not rule out the use of the present technique in connection with (future) technologies consistent with 3G or 4G/LTE, be it a wirebound communications network or a wireless communications network. On the other hand, the present technique may also be backward-compatible to a degree described herein below.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that when the following embodiments are described in the context of methods and method steps, the technique presented herein may also be embodied in a computer program product as well as in a system comprising a computer processor and a memory coupled to the processor, wherein the memory is encoded with one or more programs that execute the services, functions and steps disclosed herein.

Some of the following embodiments exemplarily focus on a mobile broadband environment in which users share a common radio resource in a cell of a radio access network. In this environment, the main issue that reduces QoE (also in terms of the start rendering time) is the competition between the users on the radio bottleneck on the last mile of the connection that none of the prior art approaches is designed to relax in particular. Some of the following embodiments demonstrate QoE enhancement possibilities with the cooperation of the access network and the UE to overcome the radio bottleneck.

Some of the embodiments focus on the QoE enhancement with an eye to the start rendering time KPI. The start rendering time is the moment some form of content is first displayed on a screen of the UE.

Without loss of generality, in some of the embodiments, the proposed solution gathers object priority information at the client side and transfers it toward the access network. An object scheduler in the access network can then do the traffic scheduling ("boosting") accordingly. The issue of potentially encrypted traffic is thus avoided by gathering information at the client side, which is fully aware of the content. Only object priorities are gathered and communicated to the network node, which does not harm any privacy considerations.

The proposed embodiments are particularly applicable for cases when web page content is rendered over a time frame of 100 to 300 ms, so that the user has a perceived delay between the web page request and the rendering time. In some embodiments, object priority information (e.g., from traffic type information) is obtained in the UE (e.g., for encrypted and/or multiplexed data traffic) and communicated to the access network, based on which the access network can boost QoE via a prioritized scheduling of objects having a high priority in terms start rendering time decreases.

The start rendering time for rendering a web page, as used herein, may depend on one or more of a TTFB connect time, a server response time, a time for processing objects in the head of the page, a time for initial page parsing and a time for rendering. It is evident that reducing the duration of one or more of those operations will also decrease the start rendering time as a whole.

FIG. 1 shows an embodiment of a communications network 200 in which aspects of the present disclosure can be performed. The communications network 200 comprises at least one UE 2001 (typically a large number of UEs), an access network 201 (e.g., a cellular radio access network) and a content server 2003 (e.g., a web or content server). In turn, the access network 201 comprises an access network node with an object scheduler 2002. The access network node may take the form of a radio base station (e.g., a NodeB or and eNodeB) or a Radio Network Controller (RNC).

In FIG. 1, the signalling delay of the communications network 200 is illustrated. It is shown that the reaction time for signalling (e.g., indicating or changing) object priorities is very low (e.g., it may be completed within 1 to 2 RTTs). This short reaction time is the result of object priority information (thinner arrow from the UE 2001 towards the object scheduler 2002) arrives much faster at the object scheduler 2002 than the served objects (thicker arrow) from the content server 2003. This short reaction time can thus be exploited for "boosting" the start rendering time of content (e.g., web pages or similar multi-object media) at the UE 2001. Such a "boosting" will even result for end-to-end encrypted traffic since it can be performed without DPI at the object scheduler 2002 in the access network 201.

In some of the embodiments, the communication between the object scheduler 2002 and the UE 2001 to convey information on object priorities can be performed (without being restricted to these solutions) on a dedicated socket between the UE 2001 and the scheduler 2002, in the ToS field of the IP packets sent by the UE 2001, or via radio signalling e.g., via MDT.

Figure 2:
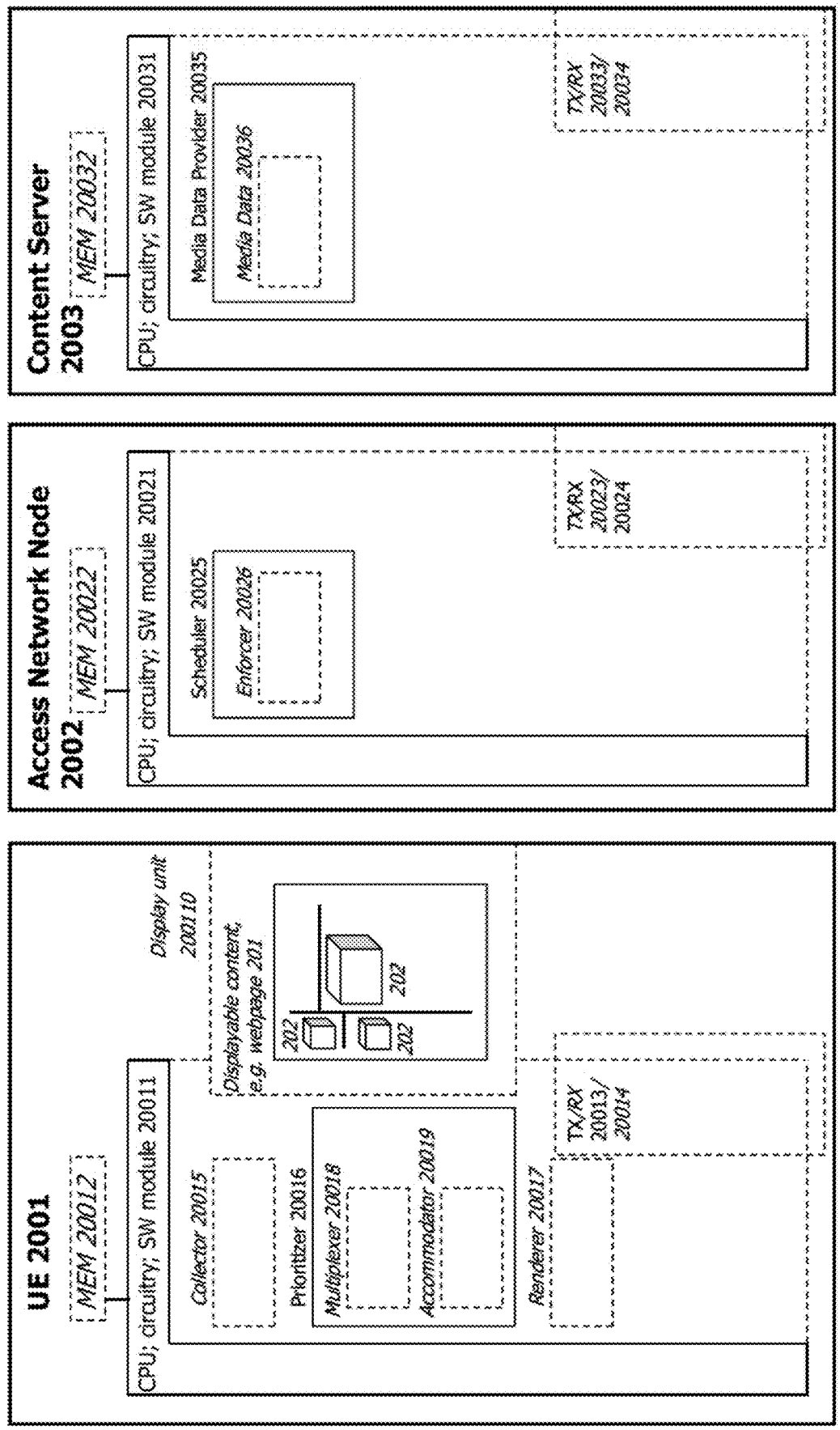
FIG. 2 shows components comprised in an exemplary device embodiment realized in the form of an apparatus (which may reside in a UE and an access network node that comprises an object scheduler)

FIG. 2 shows components comprised in an exemplary device embodiment realized in the form of the UE 2001, the access network node (implementing the object scheduler) 2002 and the content server 2003.

As shown in FIG. 2, the UE 2001 comprises a core functionality (e.g., one or more of a CPU, dedicated circuitry and/or a software module) 20011, an optional memory (and/or database) 20012, a transmitter 20013, an optional receiver 20014 and an optional display unit 200110. Moreover, the UE 2001 comprises an optional collector 20015, a prioritizer 20016, an optional renderer 20017, an optional multiplexer 20018 and an optional accommodator 20019. The UE may take the form of any wireless or wirebound user terminal, such as a smartphone, a tablet computer or a PC.

In a similar manner, the access network node 2002 (implementing the object scheduler, see FIG. 1) comprises a core functionality (e.g., one or more of a CPU, dedicated circuitry and/or a software module) 20021, an optional memory (and/or database) 20022, an optional transmitter 20023 and a receiver 20024. Moreover, the object scheduler 2002 comprises a scheduler 20025 and an optional enforcer 20026.

Finally, the content server 2003 comprises a core functionality (e.g., one or more of a CPU, dedicated circuitry and/or a software module) 20031, an optional memory (and/or database) 20032, an optional transmitter 20033 and an optional receiver 20034. Moreover, the content server 2003 comprises a media data provider 20035 for providing media data 20036.

In the following paragraphs, index x=1, 2 or 3 (for the UE 2001, the object scheduler 2002 and the content server 2003). As partly indicated by the dashed extensions of the functional blocks of the CPUs 200x1, the collector 20015, the prioritizer 20016, the renderer 20017, the multiplexer 20018 and the accommodator 20019 (of the UE 2001), the scheduler 20025 and the enforcer 20026 (of the access network node with the object scheduler 2002) and the media data provider 20035 (of the content server 2003) as well as the memory 200x1, the transmitter 200x3 and the receiver 200x4 may at least partially be functionalities running on the CPUs 200x2, or may alternatively be separate functional entities or means controlled by the CPUs 200x1 and supplying the same with information. The transmitter and receiver components 200x3, 200x4 may be realized to comprise suitable interfaces and/or suitable signal generation and evaluation functions.

The CPUs 200x1 may be configured, for example, using software residing in the memories 200x2, to process various data inputs and to control the functions of the memories 200x2, the transmitter 200x3 and the receiver 200x3 (as well as of the collector 20015, the prioritizer 20016, the renderer 20017, the multiplexer 20018 and the accommodator 20019 (of the UE 2001), the scheduler 20025 and the enforcer 20026 (of the object scheduler 2002) and the media data provider 20035 (of the content server 2003)). The memory 200x2 may serve for storing program code for carrying out the methods and method steps according to the aspects disclosed herein, when executed by the CPU 200x1.

It is to be noted that the transmitter 200x3 and the receiver 200x4 may be provided as an integral transceiver, as is indicated in FIG. 2. It is further to be noted that the transmitters/receivers 200x3, 200x4 may be implemented as physical transmitters/receivers for transceiving via an air interface or a wired connection, as routing/forwarding entities/interfaces between network elements, as functionalities for writing/reading information into/from a given memory area or as any suitable combination of the above. At least one of the collector 20015, the prioritizer 20016, the renderer 20017, the multiplexer 20018 and the accommodator 20019 (of the UE 2001), the scheduler 20025 and the enforcer 20026 (of the object scheduler 2002) and the media data provider 20035 (of the content server 2003), or the respective functionalities, may also be implemented as a chipset, module or subassembly.

Figure 3:
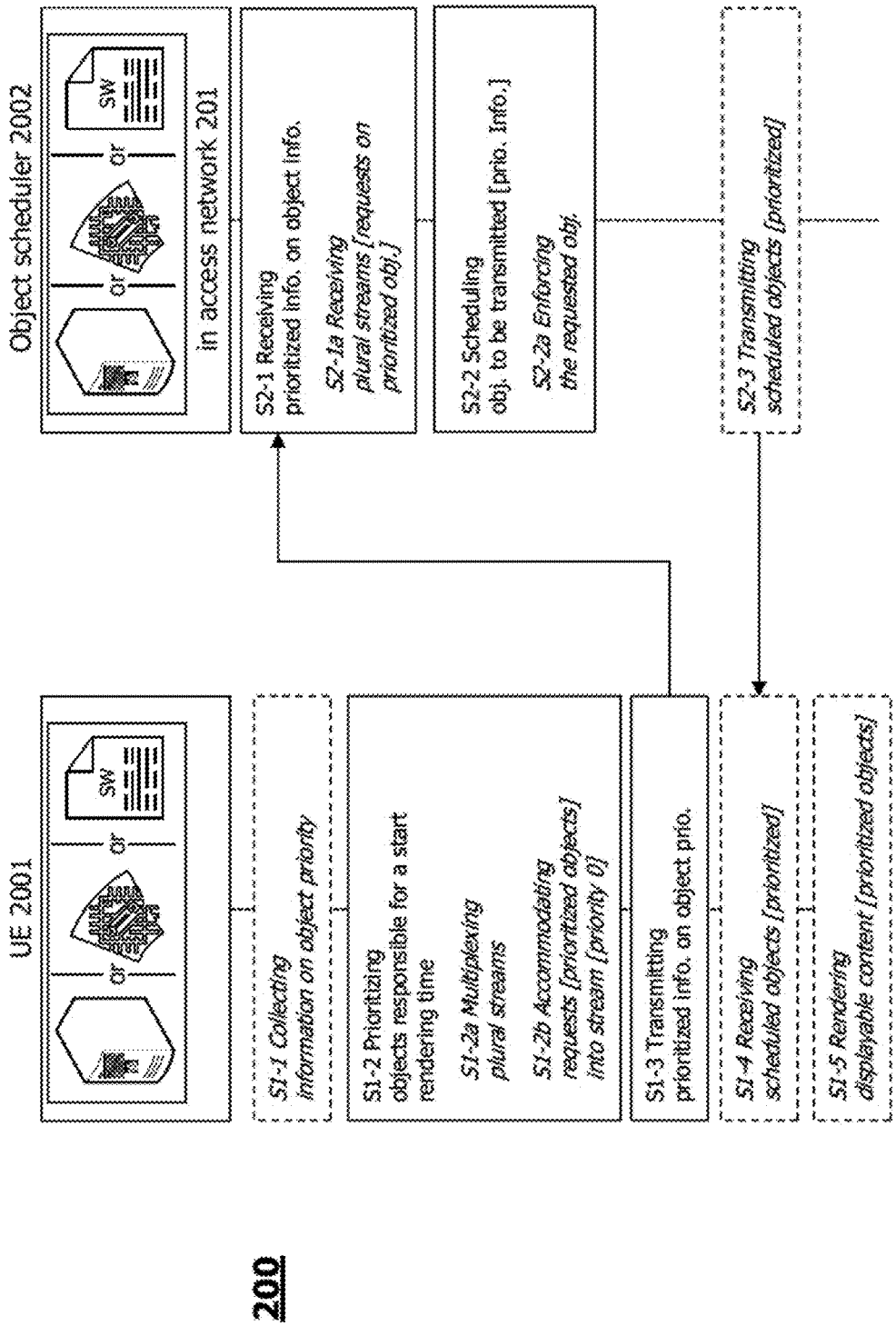
FIG. 3 shows a method embodiment which also reflects the interaction between the components of the apparatus embodiment.

FIG. 3 shows a method embodiment which also reflects the interaction between the components of the device embodiment shown in FIG. 2. In the signalling diagram of FIG. 3, time aspects between signalling are reflected in the vertical arrangement of the signalling sequence as well as in the sequence numbers. It is to be noted that the time aspects indicated in FIG. 3 do not necessarily restrict any one of the method steps shown to the step sequence outlined in FIG. 3. This applies in particular to method steps that are functionally disjunctive with each other.

In an optional step S1-1, the collector 20015 of the UE 2001 performs collecting, prior to any prioritizing, information on object priority. As an example, the collector 20015 may analyse metadata (e.g., HTML or other markup language codes) that abstractly describe the objects comprised in an item of content such as a web page or a multimedia file. As an example, the collector 20015 may identify text objects and non-text objects (e.g., pictures or other non-text media items such as video or audio clips). The collector 20015 may be part of a web browser or a dedicated application Then, in step S1-2, the prioritizer 20016 of the UE 2001 performs prioritizing, based on collected information on object priority, objects responsible for a start rendering time over other objects. As an example, text objects may be prioritized over non-text objects. The prioritizer 20016 may be part of a web browser or a dedicated application. As such, the web browser may define the object priorities. In this regard, the web browser may previously have identified, for example via the collector 20015, the objects that may potentially block the rendering of content. Such blocking objects may then be prioritized over non-blocking objects. The prioritizing performed by the prioritizer 20016 may be a binary prioritization (priority/no priority) or a multi-level prioritization (e.g., assigning to the objects a priority value from a set of three or more priority levels such as one the 8 priority levels of the QUIC scheme).

Steps S1-1 and S1-2 may be performed by software code running on the UE 2001. As an example, these steps may be performed by a web browser installed on the UE 2001 or a plug-in of such a web browser.

In an optional step S1-2a, the multiplexer 20018 of the UE 2001 performs multiplexing plural streams over one communication resource 2004, the streams having different priorities. Moreover, in an optional step S1-2b, the accommodator 20019 of the UE 2001 performs accommodating requests for the objects to be prioritized into the stream having the highest priority. The communication resource may be a Quick UDP, User Datagram Protocol, Internet Connections, QUIC, tunnel or a similar communication resource.

Figure 4:
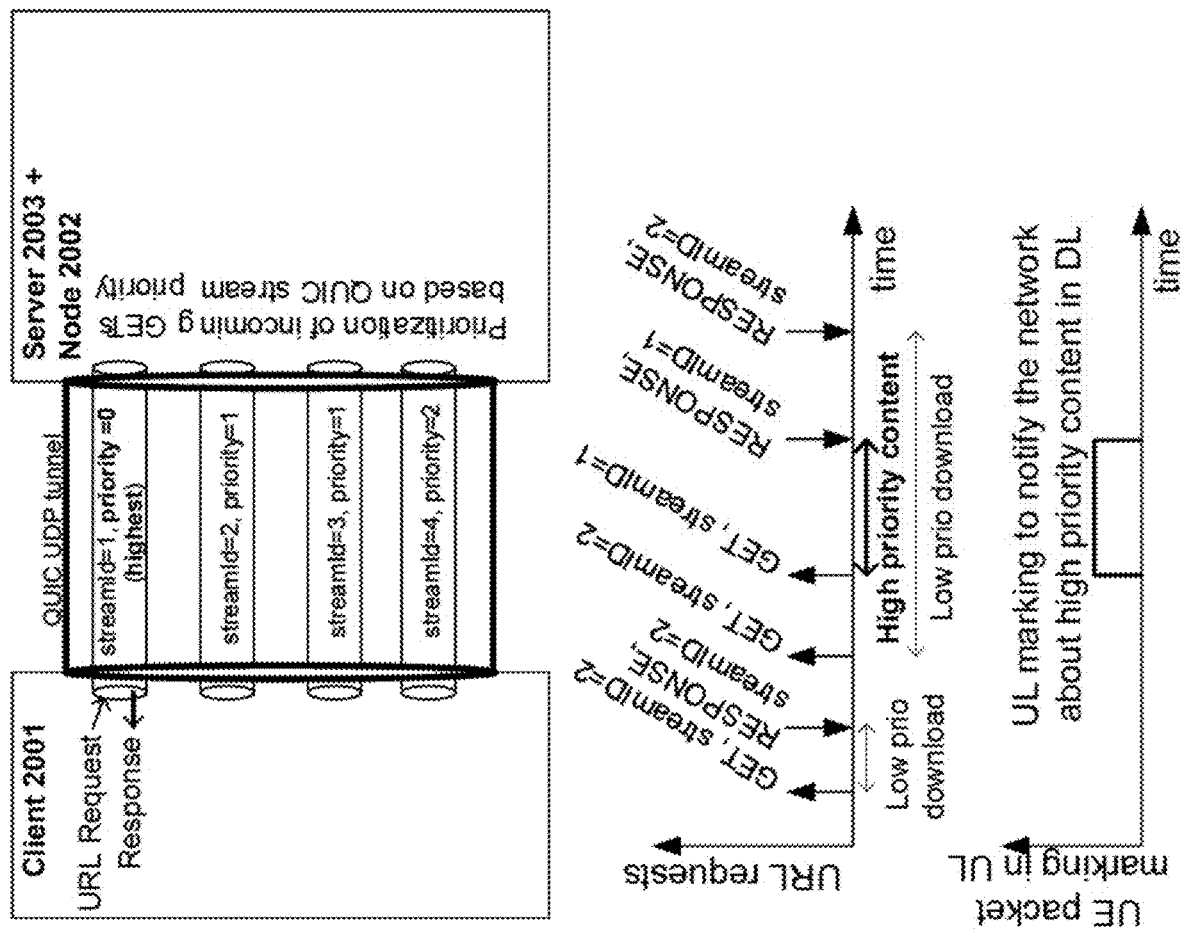
FIG. 4 shows the implementation in QUIC so as to allow object transmission enforcing.

FIG. 4 shows the implementation in QUIC so as to allow object enforcing. The UE (or client) 2001 communicates, via the QUIC tunnel, with at least one of the object scheduler 2002 or the content server 2003 (acting as a QUIC server), respectively. As shown in FIG. 4, the QUIC stream multiplexes several (potentially encrypted) traffic streams having different priorities. In turn, the object requests from the client 2001 are made in the sequence of parsing the displayable content, such as the web page. The parsing may be performed by a web page rendering engine (e.g., of a browser installed on the UE 2001).

The QUIC server 2003 generally works according to strict priority. Thus the object with the highest priority is served first (e.g., in a pre-emptive way). In case of high priority traffic transmission through the QUIC session, the frames/data packets may be marked and enforced downlink (DL) traffic in network 200 (see FIG. 1).

The QUIC scheme has 8 priority levels currently, but in the present technique, also a higher number of priority levels can be used. As stated above, the QUIC server 2003 works according to strict priority. However, checking the priority of incoming DL packets makes it possible to cancel enforcing if needed.

In this regard, the granularity of enforcement can be as fine as the object size, since the requested size of the requested objects can be tracked at the side of the UE 2001, and even the received bytes for the specific object 202 may also be count. In this way, immediately after the object 202 arrived by having received all the bytes at the UE 2001 and/or arriving an end flag in the QUIC scheme for that specific stream, the present technique is able to communicate the change of object priorities to the network node (or object scheduler) 2002.

In one variant, the UE 2001 has a pre-assigned subscription level and the pre-assigned subscription level has a first numerical priority value. Different subscription levels may have different first numerical priority values. The prioritizing may be effected by using second numerical priority values offsetting the first numerical priority value, the second numerical priority values being substantially smaller than the first numerical priority value.

In more concrete terms, the UE 2001 may have a subscription of one of several different subscription levels (such as gold/silver/bronze). Those subscription levels (first values) can be easily supported by assigning the above priorities relatively to an absolute priority of the given subscription level. For instance, the default first priority value of a silver user may be a value of 100, while a bronze user may be assigned a value of 50.

In this case, the object priority (second values) may simply be added to (or subtracted from) these base level values. For instance, a high priority object obtains a weight of +10, while a low priority object obtains a weight of +1. Accordingly, the object scheduler 2002 in the so-called bottleneck (i.e., the radio access network) can take the form of a weighted fair queue scheduler that receives the above summed/subtracted priorities and schedules accordingly.

In step S1-3, the transmitter 20013 of the UE 2001 performs transmitting information concerning the prioritized objects towards the object scheduler 2002 in the access network 201. In this regard, the transmitter 20013 may transmit the priority values assigned or identified by the prioritizer 20016. In an exemplary QUIC implementation, priority values in accordance with the 8 QUIC priority levels may be transmitted. For reducing the signalling overhead, it could also be considered to transmit only information with respect to a limited subset pertaining to the one, two or more highest priority levels.

As an example, for a high priority object (in terms of start rendering time decreases) and a "bronze" subscription, the object priority value 60 may be transmitted. In case the object scheduler 2002 is aware of the assigned subscription levels, it will be sufficient to signal the object priority value 10 (i.e., the weight of a high priority object). With each object priority value an object identifier may be sent that enables the object scheduler 2002 to identify the objects to be prioritized for the object scheduler 2002.

Transmission of the information on object priorities in step S1-13 can be performed (without being restricted to these solutions) on a dedicated socket between the UE 2001 and the scheduler 2002, in the ToS field or any other field of the IP packets sent by the UE 2001, or via radio signalling e.g., via MDT. Moreover, transmission may be performed via a QUIC tunnel as explained above.

In an exemplary TPC/IP scenario the information on object priorities may be transmitted as a 5-tuple. An exemplary 5-tuple may, for example, read (IP A/Port A/IP B/Port B/Priority: High). Port mirroring makes it possible to save on the 5-tuple information. It will be appreciated that such 5-tuple-based signalling could also be implemented using transport protocols and that the signalling may further be combined with any of the other signalling approaches and signalling contents described herein.

In step S2-1, the receiver 20024 of the object scheduler 2002 performs receiving the information concerning prioritized objects from the UE 2001. The objects responsible for a short start rendering time have been prioritized over other objects as explained above.

In an optional step S2-1a, the receiving may further comprise receiving plural streams over one communication resource 2004, the streams having different priorities, wherein requests for the objects to be prioritized are accommodated into the stream having the highest priority.

Then, in step S2-2, scheduler 20025 of the object scheduler 2002 performs scheduling objects to be transmitted to the UE 2001 based on the information concerning the prioritized objects.

In an optional step S2-2a, the scheduling may further comprise enforcing the requested objects 202 to be transmitted to the UE 2001. It is noted that the enforcing step may make use of the QUIC scheme described above in the context of FIG. 4.

Further, in an optional step S2-3, the transmitter 20023 of the object scheduler performs transmitting the scheduled objects 202 to the UE 2001. Transmission may be performed via a QUIC tunnel as explained above. The objects to be scheduled may have been received in the media data 20036 sent from the media data provider 20035 (e.g., in the form of a data base) in the content server 2003. The objects to be scheduled from the content server 2003 may arrive in any order, be it an arbitrary order or any form of pre-scheduled order.

In turn, in an optional step S1-4, the receiver 20014 of the UE 2001 performs receiving, from the object scheduler 2002, the objects 202 prioritized according to the transmitted information. In this regard, in an optional step S1-5, the renderer 20017 (in conjunction with the display unit 200110) of the UE 2001 performs rendering the displayable content with the prioritized objects.

Figure 5B:
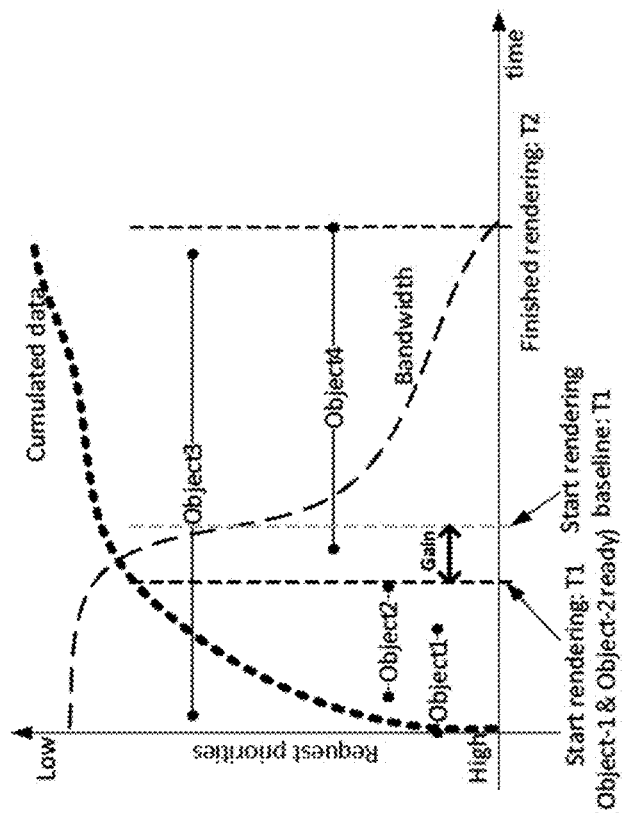
FIGS. 5A and 5B schematically explains the show start rendering time obtainable in the prior art vs. the start rendering time obtainable by the present technique.
Figure 5A:
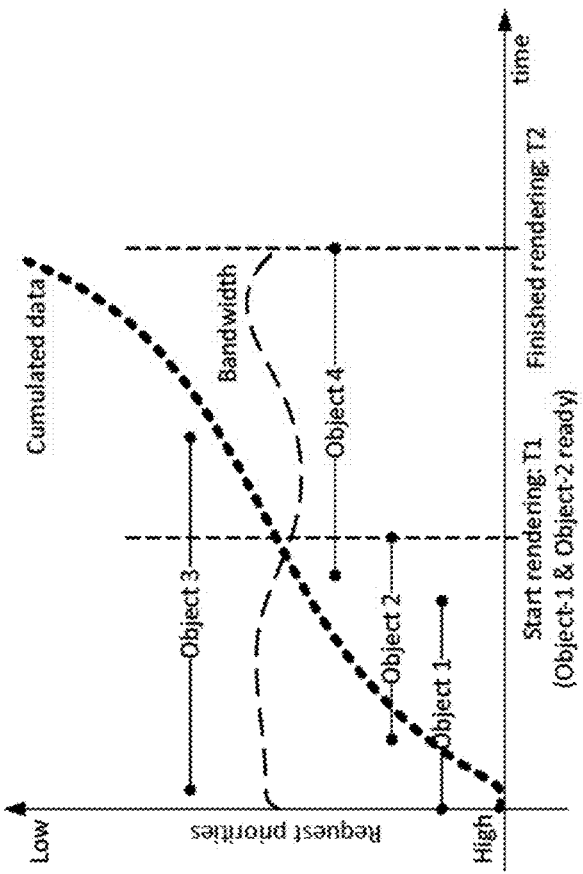

Finally, FIGS. 5A and 5B show a comparison of the start rendering time obtainable in the prior art vs. the start rendering time obtainable by the present technique.

That is, FIG. 5A shows the baseline of the start rendering time in network environments according to the prior art. Objects 202 are downloaded via various priorities that are assigned in a conventional manner by the browser on a UE. As shown in FIG. 5A, especially objects #1 and #2 influence the start rendering time T1.

In prior art browsers, the web parsing module assigns various priorities to the objects found during parsing of the displayable content, such as a web page. The priorities are assigned according to the object type. Another prior art possibility is to assign the priority manually (e.g., by the web page developer/designer) or by a script-like pagespeed module with the lazyload' attribute. Provided that the received bandwidth remains substantially stable for the whole web page download time, then the cumulative data arriving to the client is a linearly increasing function.

In contrast thereto, FIG. 5B shows the case in which the present technique is deployed, so that object scheduling in the access network is enabled to consider the object priorities. In this case, the requests of those objects having a high priority in terms of start rendering time decreases (i.e., objects #1 and #2) are prioritized to be served quicker. In this way, the data is starting to be downloaded faster (see the "Cumulated data" curve in FIG. 5B having a logarithm-like shape). Further, the objects that are not required for the web page to start rendering are delivered with lower priority (see for instance, object #3). As stated above, in exemplary implementations the object prioritiziation may be based on object priorities defined by a web browser (e.g., in accordance with the priority levels defined by the QUIC scheme).

Accordingly, with the present technique, the start rendering time can be reduced (see "Gain" in FIG. 5B).

The present disclosure provides different advantages in different deployments. In many variants, the parties involved (e.g., OTT operator and end user), benefit from the improved QoE, also for end-to-end encrypted web traffic. An incrementally deployable solution is provided that does not violate privacy, but reveals request priority to the network in order for the network operator to perform in-network traffic differentiation and so support goal(s) of the executed applications. For the access network operator, a better utilization of existing capacity can be achieved while exhibiting improved QoE for end users. The total capacity that one user receives is not altered but distributed in a smarter way. Advantages for Internet content/application provider include network support for their own prioritization, while ensuring best possible QoE for the end users. No implementation of the present technique is required on content server side, while support on the client side can be incrementally introduced.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

What is claimed is:

1. A method implemented by a user equipment (UE) for enhancing rendering of displayable content comprising plural objects received from a content server via a radio access network, the method comprising:
   prioritizing, based on collected information on object priority, objects responsible for a start rendering time over other objects; and
   transmitting information concerning the prioritized objects to an object scheduler in a radio access network node of the radio access network;
   wherein the radio access network node is located between the UE and the content server; and
   wherein the object scheduler schedules the transmission of the prioritized objects from the radio access network node to the UE based on the information concerning the prioritized objects.

2. The method of claim 1, further comprising collecting, prior to the prioritizing, information on object priority.

3. The method of claim 1, further comprising:
   receiving, from the object scheduler, objects prioritized according to the transmitted information; and
   rendering the displayable content with the prioritized objects.

4. The method of claim 1, wherein the prioritizing comprises:
   multiplexing plural streams over one communication resource, the streams having different priorities; and
   accommodating requests for the objects to be prioritized into the stream having the highest priority.

5. The method of claim 4, wherein the communication resource is a Quick User Datagram Protocol Internet Connections tunnel.

6. The method of claim 1, wherein:
   the UE has a pre-assigned subscription level, the pre-assigned subscription level having a first numerical priority value; and
   the prioritizing is effected by using second numerical priority values offsetting the first numerical priority value, the second numerical priority values being substantially smaller than the first numerical priority value.

7. The method of claim 1, wherein:
   the objects are comprised in data traffic; and
   the data traffic is encrypted.

8. The method of claim 7, wherein the encryption is an end-to-end encryption.

9. The method of claim 1, wherein the displayable content is a web page.

10. The method of claim 1, wherein the UE is one out of plural UEs, and all UEs compete for a common shared radio resource in one cell of a cellular communication network.

11. A method implemented by on object scheduler in a radio access network node of a radio access network, the radio access network node being located between a content server and a user equipment (UE) for scheduling transmission of displayable content comprising plural objects to the UE, the method comprising:
   receiving information concerning prioritized objects from the UE, wherein objects responsible for a start rendering time have been prioritized over other objects; and
   scheduling transmission of the objects comprising the displayable content from the radio access network node to the UE based on the information concerning the prioritized objects.

12. The method of claim 11, further comprising transmitting the scheduled objects to the UE.

13. The method of claim 11, wherein:
   the receiving comprises receiving plural streams over one communication resource, the streams having different priorities, wherein requests for the objects to be prioritized are accommodated into the stream having the highest priority; and
   the scheduling comprises enforcing the requested objects to be transmitted to the UE.

14. The method of claim 13, wherein the communication resource is a Quick User Datagram Protocol Internet Connections tunnel.

15. The method of claim 11, wherein:
   the UE has a pre-assigned subscription level, the pre-assigned subscription level having a first numerical priority value; and
   the scheduling is effected by using second numerical priority values offsetting the first numerical priority value, the second numerical priority values being substantially smaller than the first numerical priority value.

16. A non-transitory computer readable recording medium storing a computer program product for enhancing rendering of displayable content comprising plural objects received by a user equipment (UE) from a content server via a radio access network, the computer program product comprising software instructions which, when run on processing circuitry of a (UE), causes the (UE) to:
   prioritize, based on collected information on object priority, objects responsible for a start rendering time over other objects; and
   transmit information concerning the prioritized objects to an object scheduler in a radio access network node of the radio access network;
   wherein the radio access network node is located between the UE and the content server; and
   wherein the object scheduler schedules the transmission of the prioritized objects from the radio access network node to the UE based on the information concerning the prioritized objects.

17. A non-transitory computer readable recording medium storing a computer program product for scheduling transmission of displayable content comprising plural objects to a user equipment (UE), the computer program product comprising software instructions which, when run on processing circuitry of an object scheduler scheduler in a radio access network node of a radio access network, the radio access network node being located between a content server providing the displayable content and the UE, causes the object scheduler to:
- receive information concerning prioritized objects from the UE, wherein objects responsible for a start rendering time have been prioritized over other objects; and
- schedule transmission of objects comprising the displayable content from the radio access network node to the UE based on the information concerning the prioritized objects.

18. A User Equipment for enhancing rendering of displayable content comprising plural objects received by a user equipment (UE) from a content server, the UE comprising:
- processing circuitry;
- memory containing instructions executable by the processing circuitry whereby the user equipment is operative to:
  - prioritize, based on collected information on object priority, objects responsible for a start rendering time over other objects; and
  - transmit information concerning the prioritized objects to an object scheduler in an access network in a radio access network node of a radio access network;
- wherein the radio access network node is located between the UE and the content server; and
- wherein the object scheduler schedules the transmission of the prioritized objects from the radio access network node to the UE based on the information concerning the prioritized objects.

19. An object scheduler in a radio access network node of a radio access network, the radio access network node being located between a content server providing displayable content comprising plural objects and a user equipment (UE), the object scheduler comprising:
- processing circuitry;
- memory containing instructions executable by the processing circuitry whereby the object scheduler is operative to:
  - receive information concerning prioritized objects from the UE, wherein objects responsible for a start rendering time have been prioritized over other objects; and
  - schedule transmission of objects comprising the displayable content from the radio access network node to the UE based on the information concerning the prioritized objects.

* * * * *